April 4, 1939.                H. S. KNAPP                2,153,087
                                   MOLD
                             Filed May 10, 1938
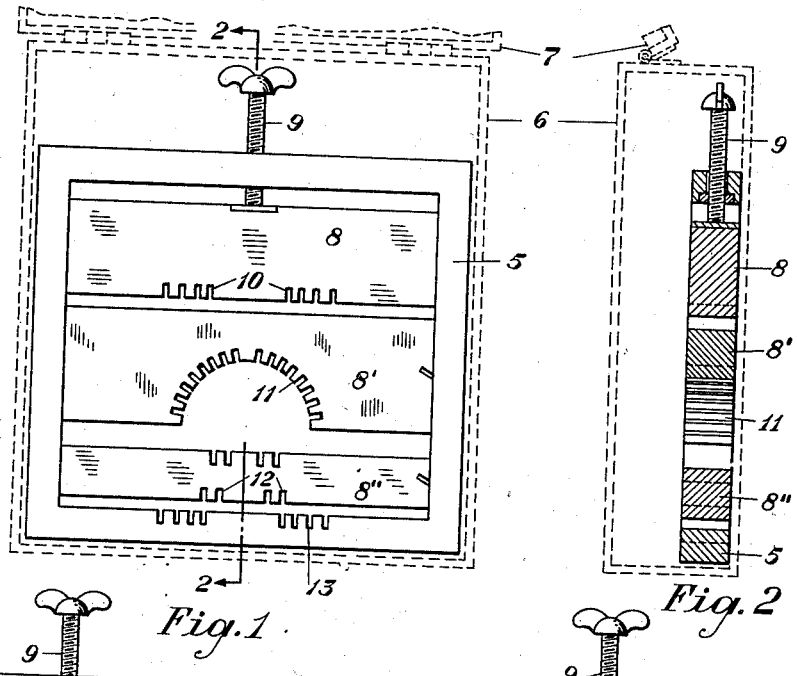
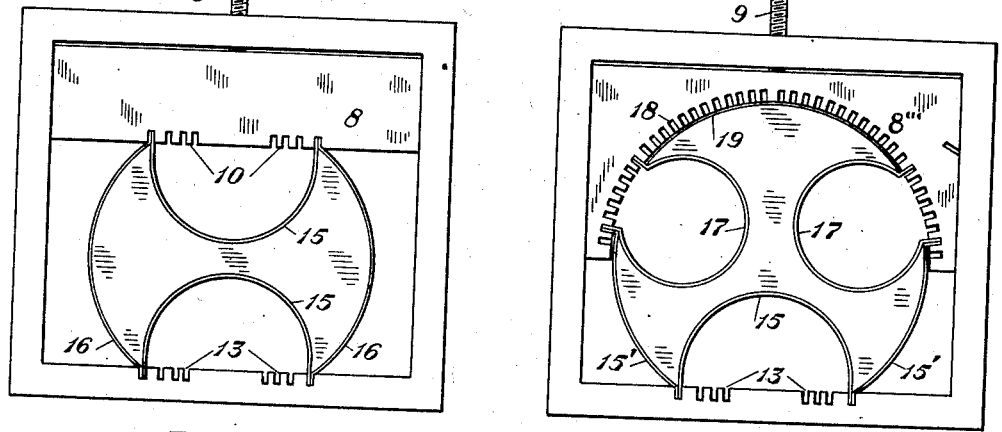
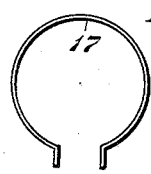  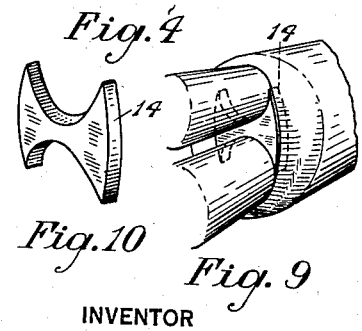
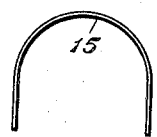 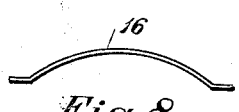
INVENTOR
   *H. S. Knapp*
BY
   ATTORNEY Patented Apr. 4, 1939

2,153,087

UNITED STATES PATENT OFFICE 2,153,087

MOLD

Howard Samuel Knapp, Denver, Colo., assignor to American Telephone and Telegraph Company, a corporation of New York Application May 10, 1938, Serial No. 207,075

2 Claims. (Cl. 22—113)

This invention relates to portable molds for use in connection with cable splicing and more particularly to molds for wedges to be applied between lead-covered cables.

One of the objects of the invention is to provide a portable mold in which a variety of combinations may be set up to form wedges of different sizes and shapes.

Another object is to provide a mold of the above character by which multi-way cable splicing may be facilitated.

A further object is to provide a portable mold by means of which wedges of a required size and shape may be formed at the place where they are to be needed for use in cable-splicing operations.

In accordance with this invention a portable mold is provided which is adapted to hold all combinations of set-ups required of forming wedges of all desirable sizes and shapes to be used in multi-way cable splicing.

In the drawing in which similar reference characters represent like parts throughout Figure 1 is a plan view of a frame having certain filler blocks which may be used in connection with the mold shown enclosed in a metal casing or container as indicated by dotted lines;

Fig. 2 is a section taken on the line 2—2 of Fig. 1;

Fig. 3 is a plan view of the mold showing a set-up therein which may be used in forming a wedge of the general shape of the wedge indicated in Fig. 10;

Fig. 4 is a plan view of the mold having a set-up which may be used in forming a three-way wedge for a main cable and two parallel branch cables;

Figs. 5, 6, 7 and 8 are various forms of flexible cable guides which provide walls within which a wedge may be molded in accordance with the combination desired;

Fig. 9 is a perspective view of a two-way or Y splice showing a wedge in position between two branch cables and adjacent the end of a main cable; and Fig. 10 is a perspective view of one type of wedge which may be formed in accordance with this invention.

In splicing operations of lead-covered electric cables it is often desired to splice one or more of the branch cables to a main or trunk cable. In such grouped multiple branch splices it is expedient to provide a wedge between the branch cables and main cables at the point where they are spliced. Due to the multiplicity of combinations and the various sizes and positions of the branch cables, it is necessary that wedges of various sizes and formations be used in accordance with the particular requirements. By means of this invention such sizes and forms of wedges can readily be molded in the field at the place where the splicing work is to be performed.

Passing now to the detailed description of the invention, there is shown in Figures 1 and 2 a substantially rectangular-shaped frame 5, which is illustrated in position in a suitable boxlike container 6. This frame and its various components are preferably made of suitable metal. This container is provided with a hinged lid 7, which is adapted to be closed and clamped to hold the equipment necessary to be used in the formation of all kinds of wedges. It will be noted by reference to Fig. 2 that considerable space is provided for all necessary equipment in addition to the frame and its associated blocks 8, 8' and 8" as disclosed in this figure. As shown in Figs. 1 and 2, the filler blocks 8, 8' and 8" are placed in the frame 5 in such position that their ends are somewhat snugly engaged with the inner sides of the frame. The filler blocks as shown in these figures are not illustrative of any set-up to be used in the formation of wedges, but are the positions they may occupy when carried around in the container while not in use. It will be noted that the thumb screw 9 has its shank extending through the upper bar of the frame 5 and serves to hold the blocks firmly in place. This thumb screw functions similarly to and also holds all set-ups in place in connection with the molded operations in shaping wedges, as will be presently described.

The blocks 8, 8' and 8" as more clearly indicated in Fig. 1, are of different types. The block 8 in the uppermost position in the frame 5 has notches 10 cut in its longitudinal bottom edge. The next succeeding block has a cutaway-arcuate portion at its midpoint in which a series of notches 11 are provided. The lowermost block has notches 12 cut in each of its longitudinal edges. The bottom bar of the frame 5 also has notches, 13, cut on its inside edge. It will be understood that the blocks 8, 8' and 8" illustrated are only part of the block equipment, as blocks of other combinations may also be used.

In Fig. 3 there is shown a set-up for making a wedge 14 of substantially the form illustrated in Figs. 9 and 10. In this set-up the uppermost block 8 in Fig. 1 with the notches 10 may be used for the top portion, and the bottom inner edge of the frame with the notches 13 may be used for the lower portion. A flexible spring or cable guide (Fig. 6) may have its terminals engaged in the notches 10, and a second cable guide 15 may have terminals likewise engaging with the notches 13. These cable guides form two walls of an enclosure which may be completed by a pair of cable guides 16 (Fig. 8). The associated terminals of the respective cable guides are positioned together in the same notches as illustrated. The thickness of the these guides is such that a tight fit is effected when the terminals are positioned in this manner. Molten material may be poured in this enclosure to a height corresponding to the height of the cable guide walls. When this material becomes sufficiently cool it may, of course, be removed in the form of a wedge and additional wedges of similar formation may be made in accordance with this set-up. The wedge just described may be used in connection with both main and branch cables. As previously described, the adjustable screw 9 serves to maintain the elements in the positions shown.

It will be understood that the particular blocks 8 to be used for a particular set-up are selected in accordance with the size of cable and combination splices desired. This, of course, also applies to the cable guides which form the walls for the enclosure within which the molten metal is introduced. These cable guides are numbered and such number corresponds to the number of the cable combination and number applied to the blocks to be used for making wedges for such combination.

In Fig. 4 there is shown a block 8''', which has a comparatively large arcuate-notched surface. This block and associated cable guides form a set-up which may be used to mold a large-sized three-way wedge for a large-sized main cable and for a pair of branch cables. The cable guides 15 and 15' are used in this set-up and the cable guides 17—17 are used to form walls of a wedge in which the branch cables are to be positioned. The terminals of the cable guide 15 fit in the same notches 13 as the lower terminals of the cable guides 15', 15'. The other terminals of the cable guides 15', 15 register in the same notches 18 as one of the terminals of each of the cable guides 17, 17. The other terminals of the cable guides 17, 17 register in the other notches 18 of the block with the ends of the strip of cable paper 19. This strip of cable paper is formed in the arcuate surface of the block between the upper terminals of the cable guides 17, 17 and prevents molten material from entering the notches in this arcuate portion, when it is poured into the enclosure formed by the walls of the sleeve guides 15, 15', 15' and 17, 17.

After the molten material is cooled, it is removed in the form of a wedge and the various operations are followed as previously discussed in connection with Fig. 3.

While the arrangements of the invention have been illustrated as embodied in certain specific forms which have been deemed desirable, it will be understood that they are capable of embodiment in many and widely varied forms without departing from the spirit of the invention as defined in the appended claims.

What is claimed is:

1. A mold for making wedges for use in multi-way cable splicing, said mold comprising elements including a parallel-sided frame adapted to hold combinations of set-ups in assembled relation for forming wedges of various sizes and shapes, said frame and components being adapted to be positioned upon a flat surface to form a bottom therefor, said frame having vertical notches cut in at least one of its inner edges, said set-ups including at least one filler block extending between parallel sides of the frame and having vertical notches cut in one of its edges, and flexible members having terminals engaging in the notches of the frame and filler block and having portions forming certain of the walls of an enclosure into which molten material may be introduced to form wedges in accordance with the set-up assembly in the frame.

2. A mold for making wedges for use in multi-way cable splicing, said mold comprising elements including a parallel-sided frame adapted to hold combinations of set-ups in assembled relation for forming wedges of various sizes and shapes, said frame and components being adapted to be positioned upon a flat surface to form a bottom therefor, said frame having vertical notches cut in at least one of its inner edges, said set-ups including at least one filler block extending between parallel sides of the frame and having vertical notches cut in one of its edges, flexible members having terminals engaging in the notches of the frame and filler block and having portions forming certain of the walls of an enclosure into which molten material may be introduced to form wedges in accordance with the set-up assembly in the frame, and adjustable means extending through the frame and engaging a filler block to hold the set-up assembly in position.

HOWARD SAMUEL KNAPP.